United States Patent
Chen

[11] Patent Number: 6,097,463
[45] Date of Patent: Aug. 1, 2000

[54] LIQUID CRYSTAL DISPLAY DEVICE

[75] Inventor: Guo-Ping Chen, Miyagi-ken, Japan

[73] Assignee: ALPS Electric Co., Ltd., Tokyo, Japan

[21] Appl. No.: 09/162,308

[22] Filed: Sep. 28, 1998

[30] Foreign Application Priority Data

Oct. 6, 1997 [JP] Japan .................................. 9-273146
Nov. 18, 1997 [JP] Japan .................................. 9-317513

[51] Int. Cl.[7] .............................................. G02F 1/1337
[52] U.S. Cl. ......................... 349/130; 349/126; 349/129
[58] Field of Search .............................. 349/130, 126, 349/129

[56] References Cited

U.S. PATENT DOCUMENTS

| | | | |
|---|---|---|---|
| 5,543,950 | 8/1996 | Lavrentovich et al. | 359/77 |
| 5,576,860 | 11/1996 | Nakamura et al. | 359/70 |
| 5,654,780 | 8/1997 | Hasegawa et al. | 349/136 |
| 5,745,206 | 4/1998 | Koike et al. | 349/129 |
| 5,754,266 | 5/1998 | Ohta et al. | 349/139 |
| 5,793,457 | 8/1998 | Tamai et al. | 349/110 |

*Primary Examiner*—Kenneth Parker
*Assistant Examiner*—Mike Q.
*Attorney, Agent, or Firm*—Brinks, Hofer, Gilson & Lione

[57] ABSTRACT

The present invention provides a liquid crystal display device capable of realizing an in-pixel divided-alignment structure by as simple a process as possible. Each of alignment films respectively provided on a pair of transparent substrates includes a first homeotropic alignment film rubbed, and a second homeotropic alignment film not rubbed and deposited on the first homeotropic alignment film. The second homeotropic alignment film is deposited in a half region of each pixel. In the pair of alignment films, the unrubbed alignment film surface of the second homeotropic alignment film and the rubbed alignment film surface of the first homeotropic alignment film are arranged opposite to each other.

4 Claims, 8 Drawing Sheets

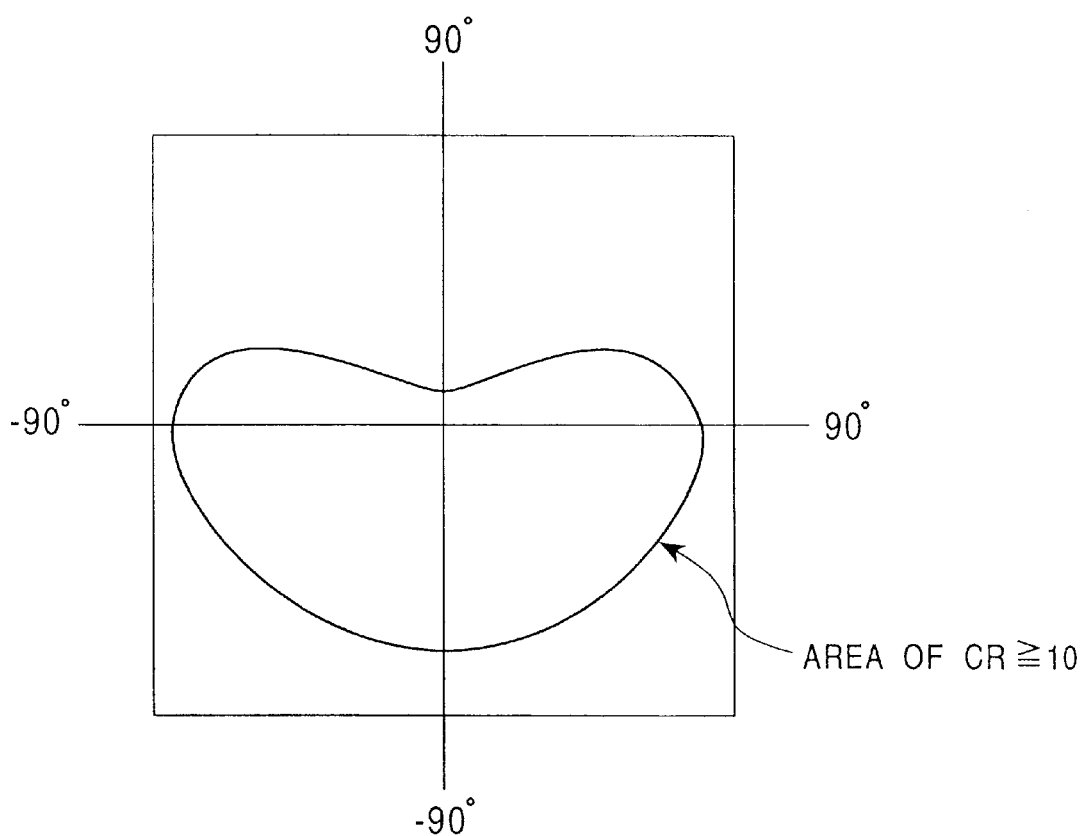

LIQUID CRYSTAL DISPLAY DEVICE

BACKGROUND OF THE INVENTION

1. Field of the Invention

The present invention relates to a liquid crystal display device having low dependency on the viewing angle, and good visibility independent of the viewing direction.

2. Description of the Related Art

TN mode liquid crystal display devices generally have the problem of dependency on the viewing angle. FIG. 10 shows the general dependency on the viewing angle of a TN mode liquid crystal display device, in which an area surrounded by a curve represents a contrast (CR) range of 10 or more. This figure indicates that the TN mode liquid crystal display device has somewhat good visibility in the transverse direction, but has poor visibility in the upward or downward direction.

On this background, various structures have recently been proposed for widening the viewing angle of a liquid crystal display device.

One of such structures is a divided-alignment structure on the pixel unit. The divided-alignment structure is a structure having domains in which liquid crystal molecules are raised in different directions by applying a voltage to each of pixels. For example, each pixel is divided into two regions, and the alignment films of the two divided pixel regions are subjected to alignment in different directions to realize this structure. In this divided alignment structure, an abrupt asymmetric contrast change in the vertical direction, which is the problem of TN mode liquid crystal display devices, is decreased and made symmetric, thereby obtaining the effect of widening the gray-scale area without reversal of gray scales. This leads to realization of a liquid crystal display device having a wide viewing angle.

FIG. 9 shows an example of the method of manufacturing a liquid crystal display device having the in-pixel divided alignment structure, and particularly shows the procedure for alignment processing. For example, the substrate 1 shown in FIG. 9A comprises source wiring (not shown) and gate wiring (not shown), which are disposed in a matrix form, and a pixel electrode 2 made of a transparent conductive material such as ITO or the like and provided in each of the regions surrounded by the source wiring and gate wiring, and a thin film transistor (not shown) connected as a switching element to each of the pixel electrodes 2. The surfaces of the pixel electrodes 2 are coated with an alignment film 3 made of a material such as polyimide or the like. On the substrate 1 are further provided a black matrix 4 coated on the non-display region around the pixel electrodes 2, and an insulating film 5.

The substrate 1 is rubbed in the direction shown by an arrow A in FIG. 9A. This rubbing can be carried out by rubbing the surface of the alignment film 3 with a roller having a rubbing cloth wound thereon.

Next, a photoresist film 6 is deposited to cover a half region of each pixel, as shown in FIG. 9B, and then rubbed in the direction shown by an arrow B opposite to the arrow A shown in FIG. 9A, as shown in FIG. 9C. When the photoresist film 6 is then separated. as shown in FIG. 9D, the rubbing direction in the region covered with the photoresist film 6 is the direction shown by the arrow A because the surface of the alignment film 3 is not subjected to second rubbing, while the rubbing direction in the region not covered with the photoresist film 6 is the direction shown by the arrow B because the surface of the alignment film 3 is subjected to second rubbing. In this way, two regions subjected to alignment processing in different directions are formed in each of the pixels. The substrates 1 and 7 processed as described above are combined, and a liquid crystal 8 is injected into the space therebetween to realize the in-pixel divided alignment structure in which liquid crystal molecules 9 are inclined in opposite directions in the same pixel, as shown in FIG. 9E.

However, the process for alignment in different directions in the divided regions of each fine pixel comprises rubbing, coating photoresist over the entire surface, pattering, rubbing, and separating the photoresist, and is thus complicated, thereby causing the problem of decreasing yield and increasing the production cost. Also this method requires two times of rubbing, and has the need to leave the second rubbing direction in the region where first rubbing and second rubbing are overlapped. There is also the problem of causing difficulties in appropriately controlling conditions of each time of rubbing processing.

Also a liquid crystal display device having the above in-pixel divided alignment structure causes disturbance (referred to as "disclination" hereinafter) in alignment of liquid crystal molecules in the vicinity of the boundary between two regions in each pixel having different alignment directions of liquid crystal, and thus has the possibility of leakage of light in this region. Therefore, a measure is required for making the leakage of light unnoticeable by providing a linear black mask on the opposite substrate side. However, this method causes the problem of decreasing the aperture ratio. Particularly, it is disadvantageous that such a black mask must be provided at the center of each pixel. Namely, this method cannot solve the problem of decreasing the aperture ratio even by employing the in-pixel divided alignment structure for widening the viewing angle.

SUMMARY OF THE INVENTION

The present invention has been achieved for solving the above problems, and an object of the present invention is to provide a liquid crystal display device capable of realizing an in-pixel divided alignment structure by as simple a process as possible.

It is another object of the present invention to provide a liquid crystal display device capable of preventing a decrease in the aperture ratio and having low dependency on the viewing angle and good visibility independent of the viewing direction.

A liquid crystal display device of the present invention comprises a pair of substrates each having an alignment film and arranged opposite to each other, and a liquid crystal layer provided between the substrates, wherein each of the alignment films includes a first homeotropic alignment film which is rubbed, and a second homeotropic alignment film which is deposited on the first homeotropic alignment film in a half region of each pixel and which is not rubbed, and in the pair of alignment films, the unrubbed surface on which the second homeotropic alignment film is deposited and the rubbed surface in which the first homeotropic alignment film is exposed are arranged opposite to each other.

In the formation of such an in-pixel divided alignment structure, the first homeotropic alignment film is formed over the entire surface of the substrate, and then rubbed, and, for example, a half region of each pixel is covered with any desired mask material, and the second homeotropic alignment film is then formed In the regions not covered with the mask material, followed by removal of the mask material. A pair of the substrates subjected to such alignment processing are combined so that the surface of the unrubbed homeotropic alignment film and the surface of the rubbed homeotropic alignment film are arranged opposite to each other.

When the unrubbed homeotropic alignment film and the rubbed homeotropic alignment film are arranged opposite to each other with the liquid crystal layer held therebetween, the liquid crystal molecules are vertically raised on the surface side of the unrubbed homeotropic alignment film, and the molecules are inclined to the rubbing direction on the surface side of the rubbed homeotropic alignment film. In the present invention, the unrubbed second homeotropic alignment film is deposited on the rubbed first homeotropic alignment film in a half region of each pixel, and in the pair of alignment films, the unrubbed surface on the second homeotropic alignment film and the rubbed surface on the first homeotropic alignment film are arranged opposite to each other. This represents that in the pair of the alignment films, the unrubbed homeotropic alignment film and the rubbed homeotropic alignment film in the respective half regions of each pixel have reversed positional relation. Therefore, the liquid crystal molecules are inclined in opposite directions in the respective half regions of each pixel, and thus asymmetric contrast due to the alignment directions of the liquid crystal is averaged in each pixel, thereby widening the viewing angle as a whole.

Since this construction of the present invention can be realized by only one time of rubbing, it is possible to simplify the process as compared with a conventional method requiring two times of rubbing, and eliminate the need to appropriately control processing conditions for each time of rubbing.

The liquid crystal display device of the present invention comprises a pair of substrates each having the alignment film, and the liquid crystal layer provided between the two substrates, wherein the alignment films are rubbed in opposite directions in adjacent pixels.

An example of the method of forming the divided alignment structure in adjacent pixels comprises forming the first homeotropic alignment film over the entire surface of the substrate, rubbing the alignment film, covering alternate pixels with any desired mask material, forming the second homeotropic alignment film in the pixels not covered with the mask material, and then removing the mask material. Then, a pair of substrates subjected to the above alignment processing are combined so that the surface of the unrubbed homeotropic alignment film and the surface of the rubbed homeotropic alignment film are arranged opposite to each other.

By rubbing in opposite directions in adjacent pixels to form the divided alignment structure, the liquid crystal molecules are inclined in opposite directions in adjacent pixels, and asymmetric contrast due to the alignment directions of the liquid crystal is averaged in adjacent two pixels, thereby widening the viewing angle as a whole.

In the construction of the present invention, since rubbing in opposite directions in adjacent pixels causes no disclination in pixels, unlike in a liquid crystal display device having the in-pixel divided alignment structure, a black mask need not be provided for preventing leakage of light, thereby causing no problem of decreasing the aperture ratio. In the construction of the present invention, even if disclination occurs, disclination occurs in the region between pixels, and thus does not influence on the aperture ratio because the black mask is basically provided in this region.

In the liquid crystal display device of the present invention, the width of each pixel in the short-side direction is 50 µm or less.

In a conventional liquid crystal display device, the width of each pixel in the short-side direction thereof is about 100 µm. When two adjacent pixels in the short-side direction are colored with the same color filter to average the contrast, the two pixels are recognized as one dot. However, in the present invention, the width of each pixel in the short-side direction is 50 µm or less, and it is thus possible to obtain a liquid crystal display device having resolution by no means inferior to conventional liquid crystal display devices.

BRIEF DESCRIPTION OF THE DRAWINGS

FIG. 10 is a drawing showing the general dependency on the viewing angle of a conventional TN mode liquid crystal display device.

DESCRIPTION OF THE PREFERRED EMBODIMENT

A first embodiment of the present invention is described below with reference to FIGS. 1 to 3.

Figure 1:
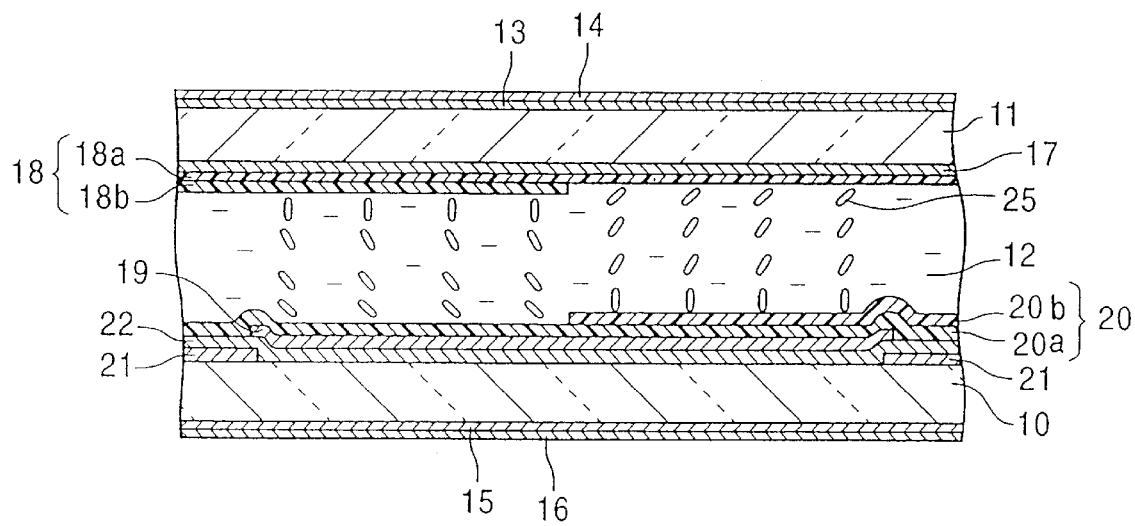
FIG. 1 is a sectional view showing the schematic construction of a liquid crystal display device in accordance with a first embodiment of the present invention.

FIG. 1 is a sectional view showing the schematic construction of a liquid crystal display device of this embodiment.

Referring to FIG. 1, a pair of transparent substrates 10 and 11 are arranged vertically opposite to each other with a predetermined cell gap therebetween, and a liquid crystal layer 12 is disposed between the substrates 10 and 11. On the outsides of the upper substrate 11 and the lower substrate 10 are provided a retardation plate 13 and a polarizer 14, and a retardation plate 15 and a polarizer 16, respectively. On the liquid crystal side of the upper substrate 11 are provided a common electrode 17 and an alignment film 18, and on the liquid crystal side of the lower substrate 10 are provided a pixel electrode 19 made of a transparent conductive material such as ITO or the like, and an alignment film 20. To the pixel electrode 19 is connected a thin film transistor (not shown) as a switching element for each pixel, and to each of the thin film transistors are connected source lines and gate lines (not shown). However, these lines are not shown in FIG. 1. On the liquid crystal side of the lower substrate 10 are further provided a black matrix 21 for covering the non-display region around the pixel electrode 19, which does not contribute to display of the liquid crystal, and an insulating film 22.

The alignment films 18 and 20 respectively provided on the substrates 11 and 10 comprise first homeotropic alignment films 18a and 20a which are rubbed, and second homeotropic alignment films 18b and 20b which are deposited on the first homeotropic alignment films 18a and 20a, respectively, and which are not rubbed. The second homeotropic alignment films 18b and 20b are respectively provided in the half regions of each pixel. In consideration of the pair of alignment films on the upper and lower substrates, the unrubbed alignment film surface on which each of the second homeotropic alignment films 18b and 20b is deposited, and the rubbed alignment film surface in which each of the first homeotropic alignment films 18a and 20a is exposed are arranged opposite to each other. Therefore, liquid crystal molecules 25 are inclined in opposite directions within each pixel between the alignment films 18 and 20. As the material for the first and second homeotropic alignment films 18 and 20, a polyimide resin, a polyamide resin, and the like can be used, and specifically JALS-204 (trade name, produced by Nihon Synthetic Rubber Co., Ltd.) or the like can be used. As the liquid crystal material, a liquid crystal having negative dielectric anisotropy, i.e., a liquid crystal having a torque action of alignment vertical to the electric field applied, is used. Specifically, MJ95955 (trade name, produced by Merck Japan Ltd.) can be used.

Next, the method of manufacturing the liquid crystal display device having the above construction, particularly the procedure for the alignment process, is described with reference to FIG. 3.

Figure 3A:
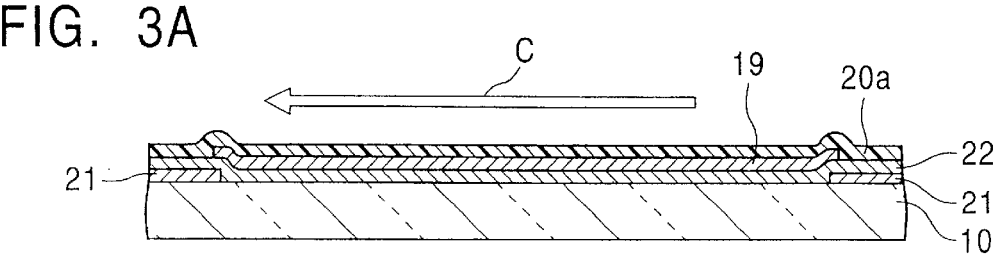
FIGS. 3A–3E are a sectional view successively showing the steps for alignment of the liquid crystal display device in accordance with the first embodiment.
Figure 3B:
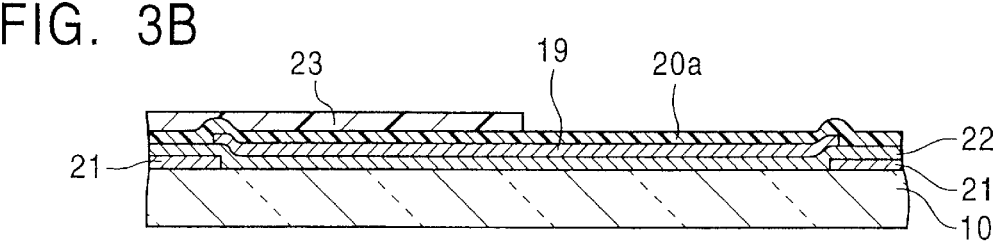
Figure 3C:
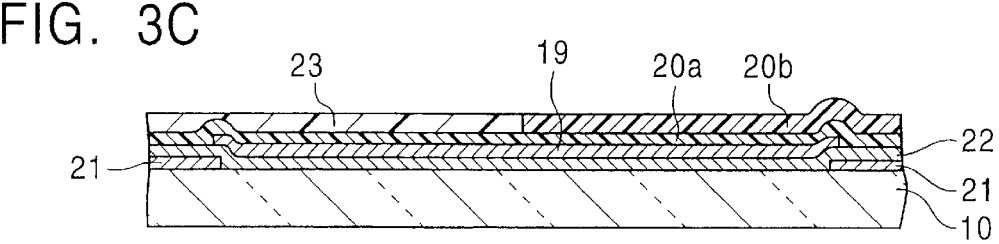
Figure 3D:
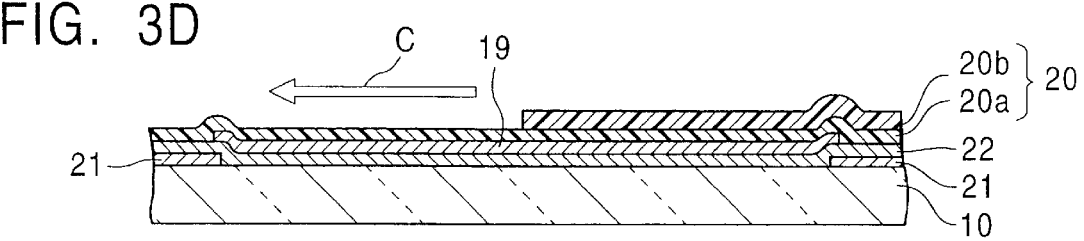

First, as shown in FIG. 3A, the first homeotropic alignment film 20a is coated over the entire surface of the substrate 10, and then rubbed by a normal method of rubbing the surface of the alignment film with a roller having a rubbing cloth wound thereon in the specified direction, i.e., the direction shown by arrow C. With the homeotropic alignment film, with no electric field applied, liquid crystal molecules are raised perpendicularly to the alignment film surface. However, by rubbing the homeotropic alignment film, the inclination angle becomes about 3° from the right angle with the alignment film surface. Next, as shown in FIG. 3B, a photoresist film 23 is coated, and then patterned to leave the photoresist film 23 only in a half region of each pixel. Then, as shown in FIG. 3C, the second homeotropic alignment film 20b is coated on the regions not coated with the photoresist film 23. The coating thickness of each of the first and second alignment films 20a and 20b may be about 500 Å. Then, as shown in FIG. 3D, the photoresist film 23 is removed. Although FIGS. 3A to 3D show only the lower substrate, a series of the same works is carried out for the upper substrate 11.

Figure 3E:
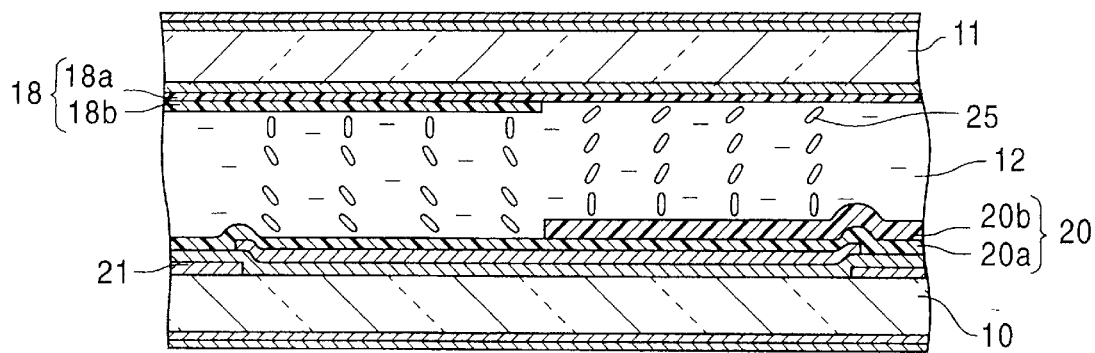

As shown in FIG. 3E, the upper and lower substrates 11 and 10 subjected to the above works are combined so that the second homeotropic alignment films 18b and 20b of the respective substrates are opposite to the first homeotropic alignment films 20a and 18a, respectively, i.e., the surface of the unrubbed homeotropic alignment film and the surface of the rubbed homeotropic alignment film are arranged opposite to each other. The liquid crystal 12 is injected between the substrates 10 and 11. In this way, the liquid crystal display device of this embodiment is produced.

Figure 2A:
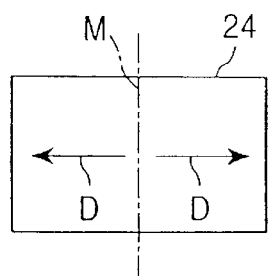
FIGS. 2A, 2B are a drawing showing an example of an in-pixel divided alignment structure in accordance with the first embodiment in which alignment is performed in different directions.

In the liquid crystal display device of this embodiment, the liquid crystal molecules between the pair of the alignment films 18 and 20 are raised at right angles on the surface sides of the second homeotropic alignment films 18b and 20b (not rubbed), and the liquid crystal molecules are inclined at about 3° from the right angle on the surface sides of the first homeotropic alignment films 18a and 20a (rubbed), as shown in FIG. 3E (FIG. 3 shows the exaggerated state of the molecules). By applying an electric field in this state, the liquid crystal molecules between the alignment films 18 and 20 are entirely inclined to the rubbing direction to cause the state wherein the liquid crystal molecules are inclined in opposite directions in the half regions of each pixel, as shown in FIG. 2A (In FIG. 2A, the alignment directions of the liquid crystal in a pixel 24 are shown by arrows D). Therefore, in the structure of this embodiment, the asymmetric contrast due to the alignment directions of the liquid crystal is averaged within a pixel, thereby widening the viewing angle of the liquid crystal display device as a whole.

Since the structure of this embodiment can be realized by only one time of rubbing, the process can be simplified as compared with a conventional method requiring two times of rubbing. As a result, it is possible to improve the yield and decrease the production cost, as compared with the conventional method. Furthermore, there is no need to strictly control the processing conditions of each of the two times of rubbing, thereby simplifying setting of the rubbing conditions.

Figure 2B:
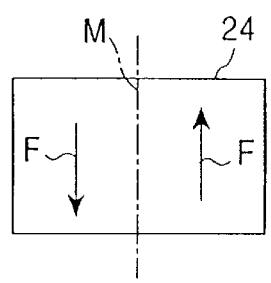

The technical field of the present invention is not limited to the above embodiment, and various changes can be made within the scope of the gist of the present invention. Although, in this embodiment, the divided regions have the opposite alignment directions (arrow D) perpendicular to the dividing line M where each pixel is divided into two regions, as shown in FIG. 2A, another structure may be used in place of the above structure. For example, in the structure shown in FIGS. 3A to 3E, when the rubbing direction shown in FIG. 3A is the direction perpendicular to the drawing, the respective divided regions have the opposite alignment directions (arrow F) along the dividing line M, as shown in FIG. 2B.

Although, in the method of forming the second homeotropic alignment film only on a half region of each pixel in accordance with this embodiment, the photoresist film is patterned to leave the photoresist film only in a half region of each pixel, other various methods can also be used. For example, the second homeotropic alignment film is coated with the mask material brought into contact with a substrate to cover a half region of each pixel. In addition, various materials can be used as the materials which constitute the transparent substrate, the alignment films, the liquid crystal layer, etc., and various methods can be used as the rubbing method.

Next, a liquid crystal display device in accordance with a second embodiment of the present invention is described below with reference to FIGS. 4 to 6.

Figure 4:
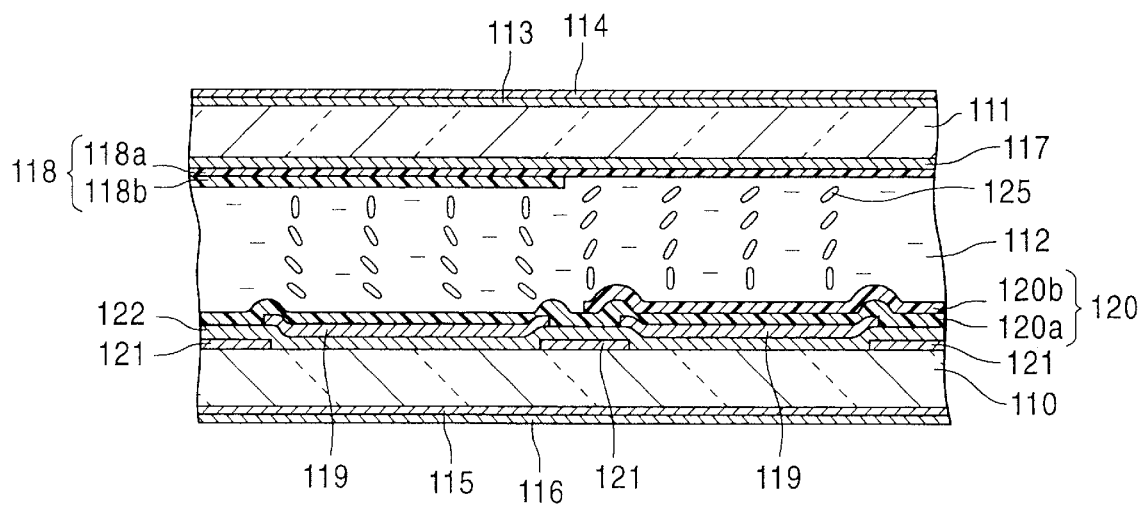
FIG. 4 is a sectional view showing the schematic construction of a liquid crystal display device in accordance with a second embodiment of the present invention.

FIG. 4 is a sectional view showing the schematic construction of the liquid crystal display device of this embodiment. Referring to FIG. 4, a liquid crystal layer 112 is provided between a pair of transparent substrates 110 and 111 arranged vertically opposite to each other with a predetermined cell gap therebetween. On the outsides of the upper substrate 111 and the lower substrate 110 are provided a retardation plate 113 and a polarizer 114, and a retardation plate 115 and a polarizer 116, respectively. On the liquid crystal side of the upper substrate 111 are provided a common electrode 117 and an alignment film 118, and on the liquid crystal side of the lower substrate 110 are provided a pixel electrode 119 made of a transparent conductive material such as ITO or the like, and an alignment film 120. To the pixel electrode 119 is connected a thin film transistor (not shown) as a switching element for each pixel, and to each of the thin film transistors are connected source lines and gate lines (not shown). However, these lines are not shown in FIG. 4. On the liquid crystal side of the lower substrate 110 are further provided a black matrix 121 for covering the non-display region around the pixel electrode 119, which does not contribute to display of the liquid crystal, and an insulating film 122.

The alignment films 118 and 120 respectively provided on the substrates 111 and 110 comprise first homeotropic alignment films 118a and 120a which are rubbed, and second homeotropic alignment films 118b and 120b which are deposited on the first homeotropic alignment films 118a and 120a, respectively, and which are not rubbed. The second homeotropic alignment films 118b and 120b are respectively provided in the pixels. In consideration of the pair of alignment films on the upper and lower substrates, the unrubbed alignment film surface on which each of the second homeotropic alignment films 118b and 120b is deposited, and the rubbed alignment film surface in which each of the first homeotropic alignment films 118a and 120a is exposed are arranged opposite to each other. Therefore, liquid crystal molecules 125 are inclined in opposite directions in adjacent pixels between the alignment films 118 and 120. As the material for the first and second homeotropic alignment films 118 and 120, a polyimide resin, a polyamide resin, and the like can be used, and specifically JALS-204 (trade name, produced by Nihon Synthetic Rubber Co., Ltd.) or the like can be used. As the liquid crystal material, a liquid crystal having negative dielectric anisotropy, i.e., a liquid crystal having a torque action of alignment perpendicular to the electric field applied, is used. Specifically, MJ95955 (trade name, produced by Merck Japan Ltd.) can be used.

Next, the method of manufacturing the liquid crystal display device having the above construction, particularly the procedure for the alignment process, is described with reference to FIG. 6.

Figure 6A:
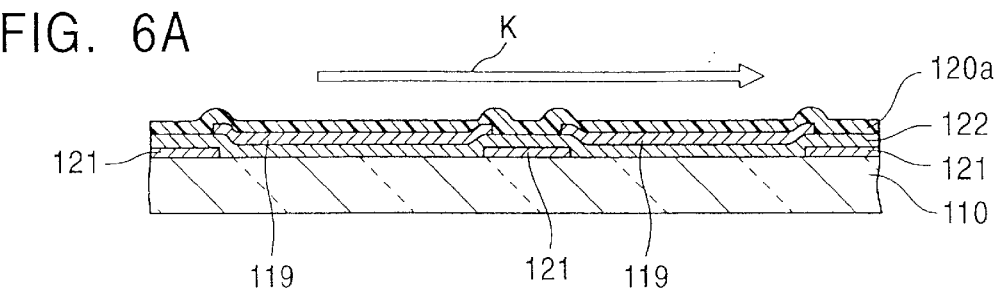
FIGS. 6A–6E are a sectional view successively showing the steps for alignment of the liquid crystal display device in accordance with the second embodiment.
Figure 6B:
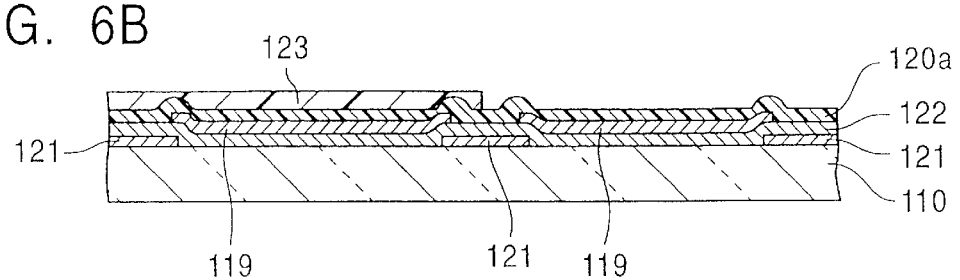
Figure 6C:
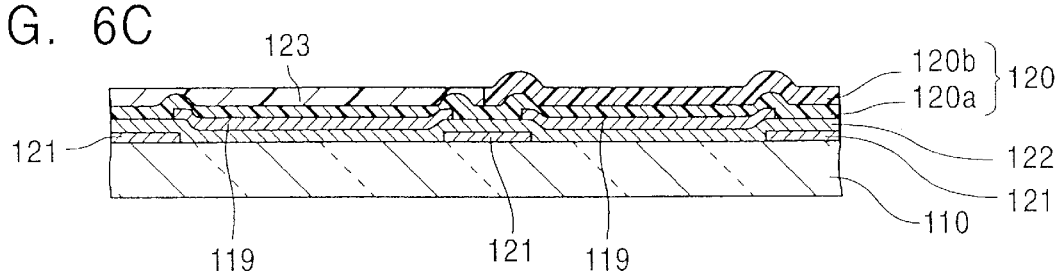
Figure 6D:
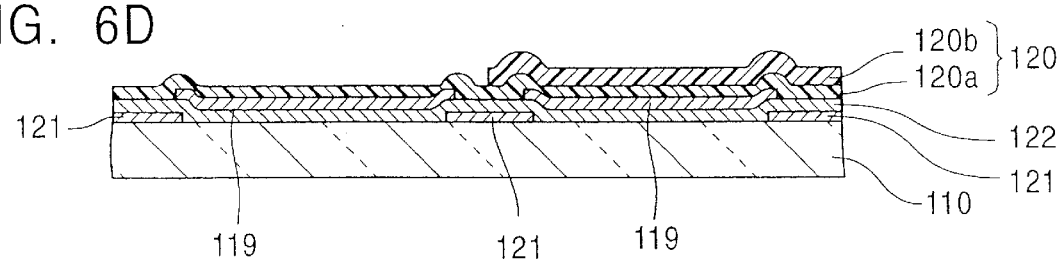

First, as shown in FIG. 6A, the first homeotropic alignment film 120a is coated over the entire surface of the substrate 110, and then rubbed by a normal method of rubbing the surface of the alignment film with a roller having a rubbing cloth wound thereon in the specified direction, i.e., the direction shown by arrow K. With the homeotropic alignment film, with no electric field applied, liquid crystal molecules are raised perpendicularly to the alignment film surface. However, by rubbing the homeotropic alignment film, the inclination angle becomes about 3° from the right angle with the alignment film surface. Next, as shown in FIG. 6B, a photoresist film 123 is coated, and then patterned to leave the photoresist film 123 in alternate pixels. Then, as shown in FIG. 6C, the second homeotropic alignment film 120b is coated on the pixels not coated with the photoresist film 123. The coating thickness of each of the first and second alignment films 120a and 120b may be about 500 Å. Then, as shown in FIG. 6D, the photoresist film 123 is removed. Although FIGS. 6A to 6D show only the lower substrate 110, a series of the same works is carried out for the upper substrate 111.

Figure 6E:
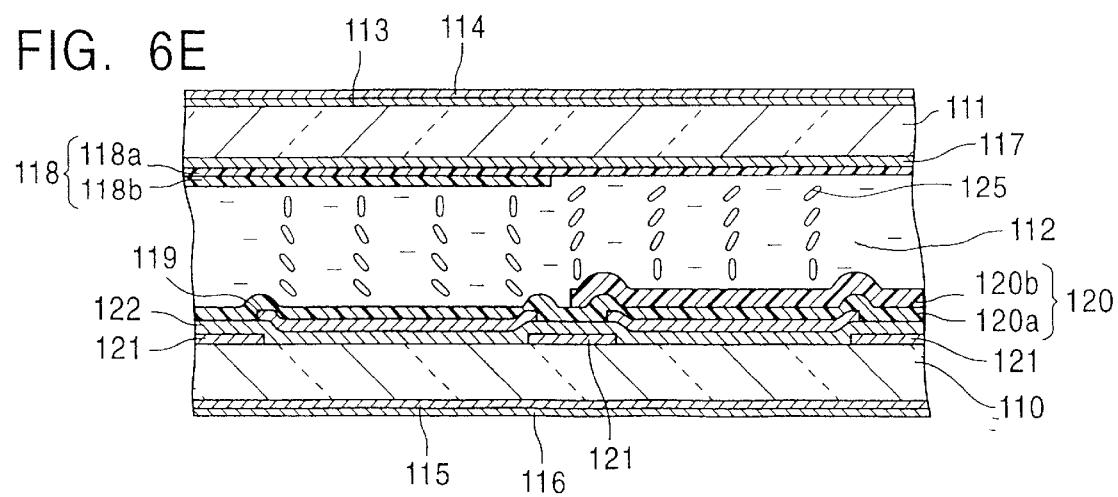

As shown in FIG. 6E, the upper and lower substrates 111 and 110 subjected to the above works are combined so that the second homeotropic alignment films 118b and 120b of the respective substrates are opposite to the first homeotropic alignment films 120a and 118a, respectively, i.e., the surface of the unrubbed homeotropic alignment film and the surface of the rubbed homeotropic alignment film are arranged opposite to each other. The liquid crystal 112 is injected between the substrates 110 and 111. In this way, the liquid crystal display device of this embodiment is produced.

Figure 5A:
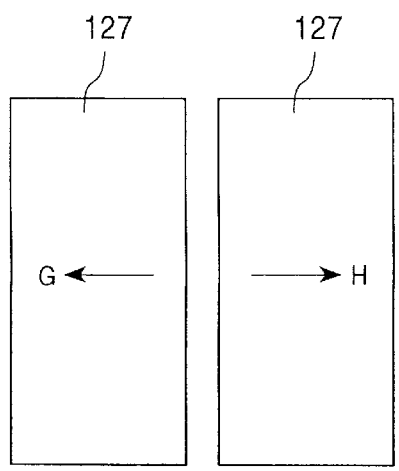
FIGS. 5A, 5B are a drawing showing an example of a divided alignment structure in accordance with the second embodiment in which alignment is performed in different directions.
Figure 5B:
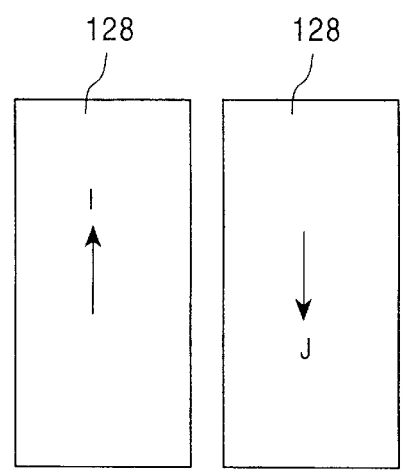

In the liquid crystal display device of this embodiment, the liquid crystal molecules 125 between the pair of the alignment films 118 and 120 are raised at right angles on the surface sides of the second homeotropic alignment films 118b and 120b (not rubbed), and the liquid crystal molecules 125 are inclined at about 3° from the right angle on the surface sides of the first homeotropic alignment films 118a and 120a (rubbed), as shown in FIG. 6E (FIG. 6E shows the exaggerated state of the molecules). By applying an electric filed in this state, the liquid crystal molecules 125 between the alignment films 118 and 120 are entirely inclined to the rubbing direction to cause the state wherein the liquid crystal molecules are inclined in opposite directions in the adjacent pixels, as shown in FIG. 5A (In FIG. 5A, the alignment directions of the liquid crystal in a pixel 127 are shown by arrows G and H). Therefore, in the structure of this embodiment, the asymmetric contrast due to the alignment directions of the liquid crystal is averaged between adjacent two pixels, thereby widening the viewing angle of the liquid crystal display device as a whole.

In the structure of this embodiment, since rubbing in the opposite directions in adjacent pixels causes no disclination in pixels, unlike a liquid crystal display device having the in-pixel divided alignment structure, a black mask for preventing leakage of light need not be provided, thereby causing no problem of a decrease in the aperture ratio. In the construction of the present invention, even if disclination occurs, disclination has no influence on the aperture ratio because the position of disclination is in the region between pixels, in which the black matrix is basically provided.

The technical field of the present invention is not limited to the above embodiment, and various changes can be made within the scope of the gist of the present invention. Although, in this embodiment, the adjacent two pixels 127 in the short-side direction thereof have the opposite alignment directions (arrows G and H) parallel to the short-side direction of each pixel, as shown in FIG. 5A, another structure may be used in place of the above structure. For example, in the structure shown in FIGS. 6A to 6E, when the rubbing direction shown in FIG. 6A is the direction perpendicular to the drawing, the adjacent two pixels 128 in the short-side direction of each pixel have the opposite alignment directions (arrows I and J) parallel to the long-side direction of each pixel.

Although, in the method of forming the second homeotropic alignment film in alternate pixels in accordance with this embodiment, the photoresist film is patterned to leave the photoresist film in alternate pixels, other various methods can also be used. For example, the second homeotropic alignment film is coated with the mask material brought into contact with a substrate to cover alternate pixels. In addition, various materials can be used as the materials which constitute the transparent substrate, the alignment films, the liquid crystal layer, etc., and various methods can be used as the rubbing method.

In the present invention, rubbing may be performed in opposite directions in adjacent pixels by rubbing a transparent substrate twice.

FIG. 7 is a sectional view showing the procedure for alignment of a liquid crystal display device having a divided alignment structure in accordance with another embodiment of the present invention.

Figure 7A:
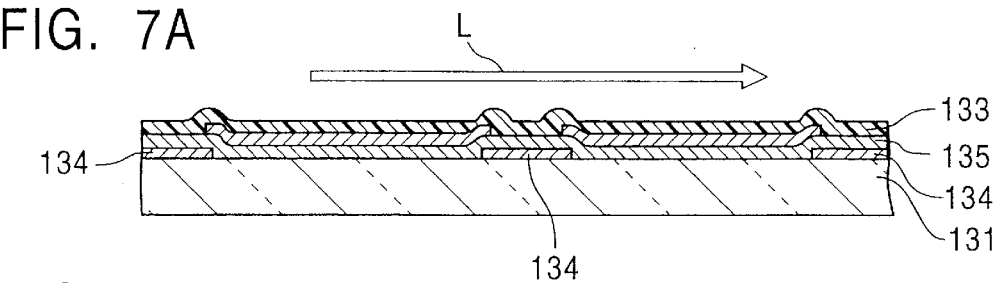
FIGS. 7A–7E are a sectional view successively showing the steps for alignment of a liquid crystal display device having a divided alignment structure in accordance with another embodiment.

The substrate 131 shown in FIG. 7A comprises, for example, source wiring (not shown) and gate wiring (not shown) which are provided in a matrix form, a pixel electrode 132 made of a transparent conductive material such as ITO or the like, and provided in each of the regions surrounded by the source wiring and the gate wiring, and a thin film transistor (not shown) connected as a switching element to each of the pixel electrodes 132. The surfaces of the pixel electrodes 132 are coated with an alignment film 133 made of a material such as polyimide or the like. The substrate 131 further comprises a black matrix 134 which covers the non-display region around the pixel electrodes, and an insulating film 135.

The substrate 131 is rubbed in the direction shown by arrow L, as shown in FIG. 7A. This rubbing can be carried out by rubbing the surface of the alignment film 133 with a roller having a rubbing cloth wound thereon.

Figure 7B:
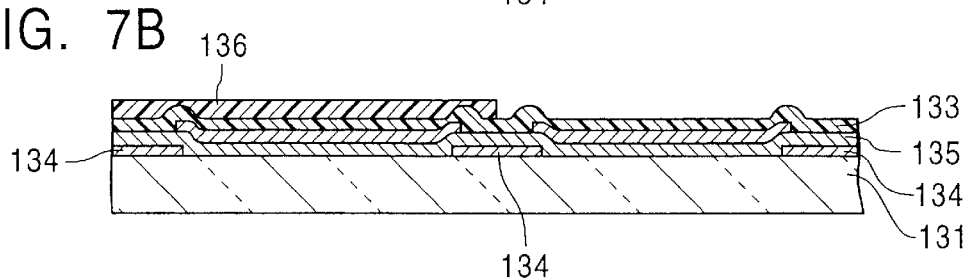
Figure 7C:
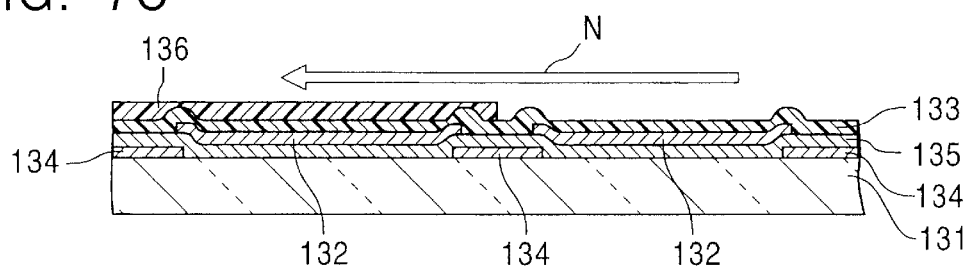
Figure 7D:
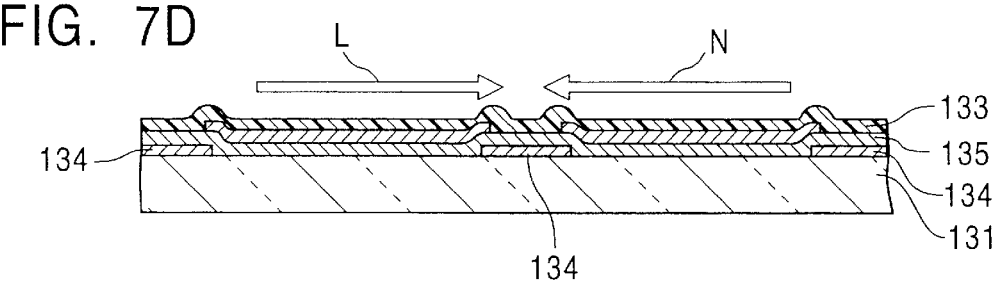
Figure 7E:
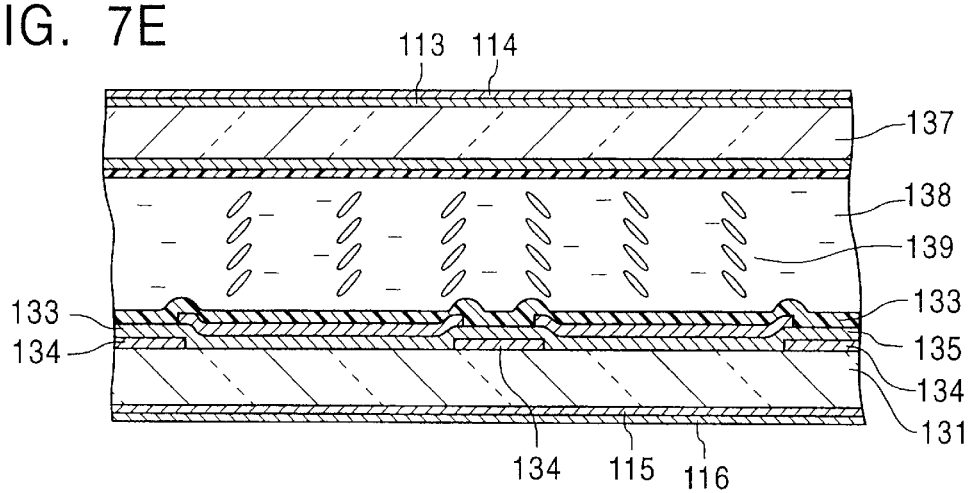

Next, a photoresist film 136 is formed in alternate pixels, as shown in FIG. 7B, and the film 136 is then rubbed in the direction of arrow N opposite to the arrow L shown in FIG. 7A, as shown in FIG. 7C. Then, the photoresist film 136 is separated to form the state wherein the regions coated with the photoresist film 136 have the rubbing direction of the arrow L because the surface of the alignment film 133 is not subjected to second rubbing, while the regions not coated with the photoresist film 136 have the rubbing direction of the arrow N because the surface of the alignment film 133 is subjected to second rubbing, as shown in FIG. 7D. As a result, two regions subjected to alignment in different directions are formed in adjacent pixels. The substrates 131 and 137 subjected to the above processing are combined, and a liquid crystal 138 is injected between the substrates to realize a divided alignment structure in which liquid crystal molecules 139 are inclined in opposite directions in adjacent pixels.

Although the present invention is described in detail below with reference to an example, the present invention is not limited to this example.

EXAMPLE

Figure 8A:
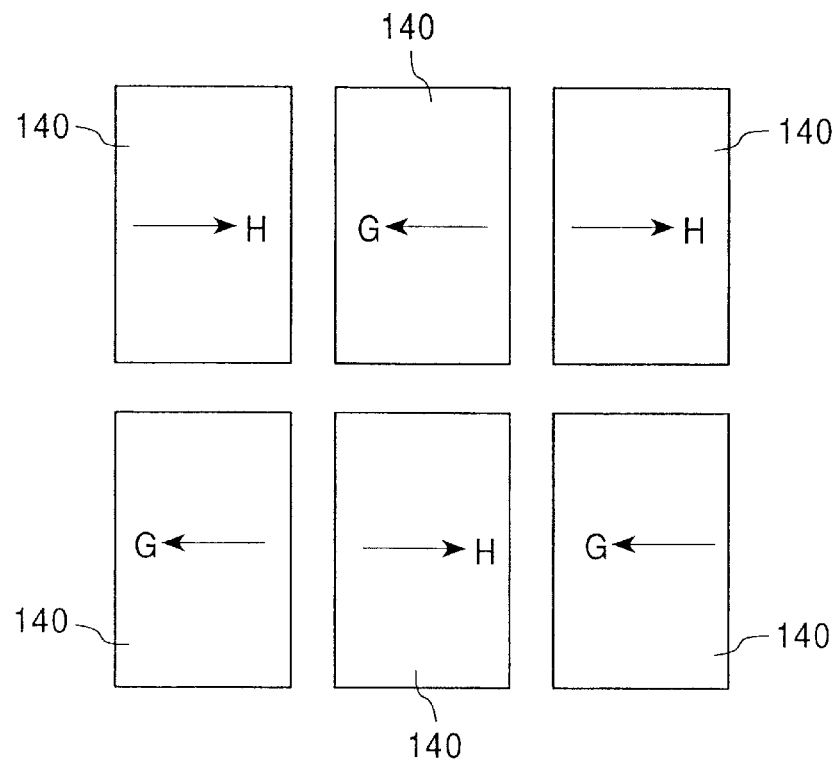
FIGS. 8A, 8B are a plan view showing an example of transparent electrodes having a divided alignment structure in accordance with an embodiment of the present invention, and an example of transparent electrodes having a conventional in-pixel divided alignment structure.

A transparent electrode was produced in which adjacent pixels 140 had opposite rubbing directions (arrows G and H), the pixel size was 40×70 µm, and the width of a black matrix was 5 µm, as shown in FIG. 8A.

COMPARATIVE EXAMPLE

Figure 8B:
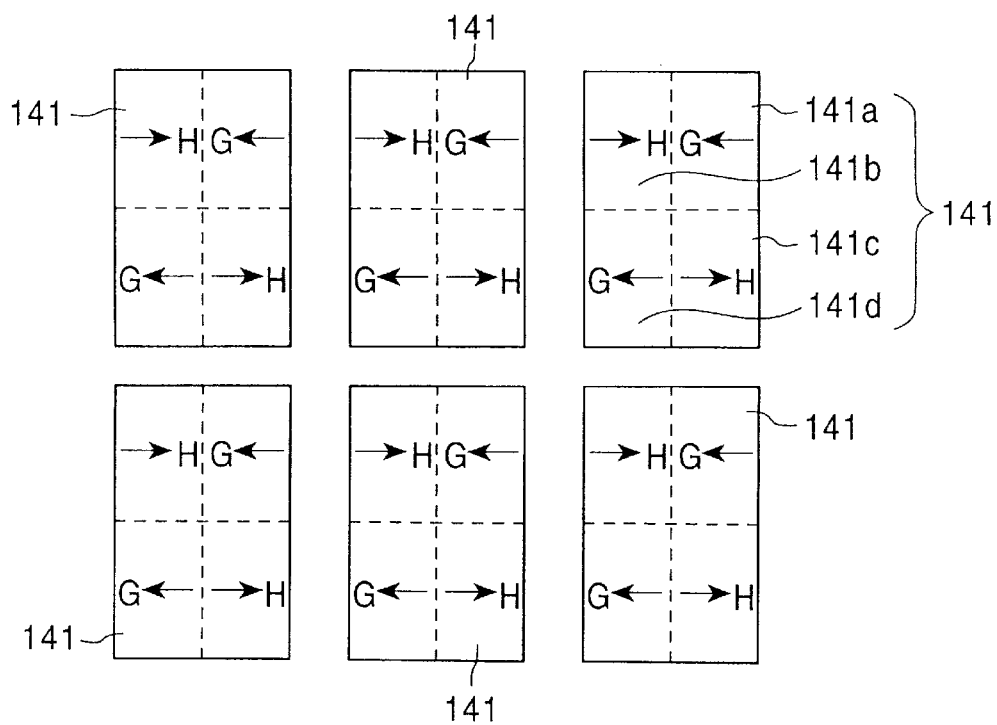
Figure 9A:
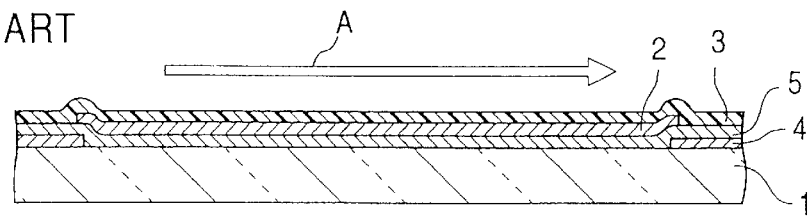
FIGS. 9A–9E are a sectional view successively showing the steps for alignment of a conventional liquid crystal display device having an in-pixel divided alignment structure.
Figure 9B:
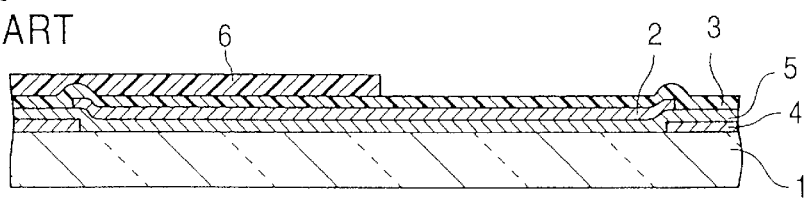
Figure 9C:
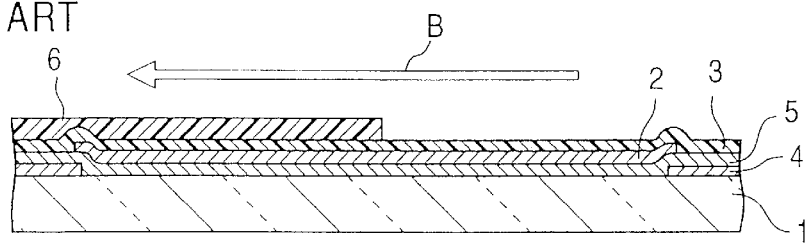
Figure 9D:
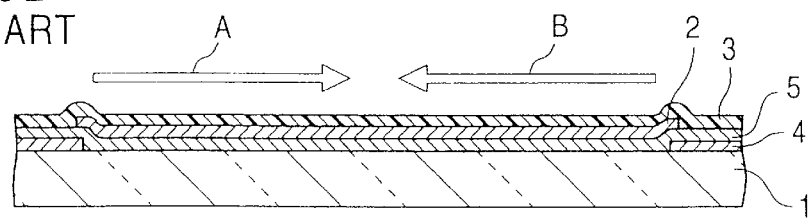
Figure 9E:
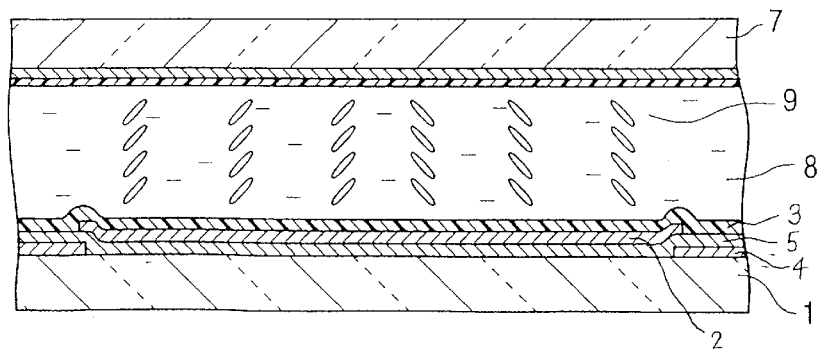

A transparent electrode was produced in which each of pixels 141 was divided into two regions so that adjacent divided regions had opposite rubbing directions (arrows G and H), the pixel size was 40×70 µm, and the width of a black matrix was 5 µm, as shown in FIG. 8B.

In each of the example and comparative example, the aperture ratio and transmittance were measured. The results obtained are shown in Table 1.

TABLE 1

|  | Example | Comparative Example |
| --- | --- | --- |
| Aperture ratio | 40% | 23% |
| Transmittance | 100% | 60% |

The transparent electrode of the example showed an aperture ratio of 40%, while the transparent electrode of the comparative example causes disclination at the center of each pixel and showed an aperture ratio of 23% due to the need to provide the black matrix for preventing leakage of light.

Assuming that the transmittance of the transparent electrode of the example was 100%, the transmittance of the transparent electrode of the comparative example was 60% due to the same cause as the above.

Namely, it is concluded that the liquid crystal display device of the present invention has excellent aperture ratio and transmittance, as compared with a liquid crystal display device having a conventional in-pixel divided alignment structure.

As described in detail above, in the liquid crystal display device of the present invention, the unrubbed second homeotropic alignment film is deposited on the rubbed first homeotropic alignment film in a half region of each pixel, so that in the pair of alignment films, the surfaces of the second homeotropic alignment film and the first homeotropic alignment film are arranged opposite to each other, and thus the liquid crystal molecules are inclined in opposite directions in the half regions of each pixel. As a result, the asymmetric contrast due to the alignment directions of the liquid crystal is averaged in each pixel, thereby widening the viewing angle of the liquid crystal display device as a whole. Since this construction can be realized by only one time of rubbing, the process can be simplified as compared with a conventional method requiring two times of rubbing, thereby improving yield and decreasing the production cost. Furthermore, there is no need to appropriately control processing conditions of each of the two times of rubbing, and thus setting of rubbing conditions can also be simplified.

As described in detail above, in the liquid crystal display device of the present invention, rubbing is carried out in opposite directions in adjacent pixels, so that liquid crystal molecules are inclined in opposite directions in adjacent pixels. As a result, the asymmetric contrast due to the alignment directions of the liquid crystal is averaged in adjacent two pixels, thereby widening the viewing angle of the liquid crystal display device as a whole.

In the construction of the present invention, rubbing in opposite directions in adjacent pixels causes no disclination, unlike a liquid crystal display device having an in-pixel divided alignment structure. Therefore, the black mask need not be provided for preventing leakage of light, thereby causing no problem of a decrease in the aperture ratio.

In the construction of the present invention, when adjacent two pixels in the short-side direction are colored with the same color filter to average contrast, the two dots are recognized as one dot. However, since the width of each pixel in the short-side direction is 5 µm or less, it is possible to obtain a liquid crystal display device having resolution by no means interior to a conventional liquid crystal display device.

Therefore, the present invention can provide a liquid crystal display device having less dependency on the viewing angle, and good visibility independent of the viewing direction.

What is claimed is:

1. A liquid crystal display device comprising a pair of substrates arranged opposite to each other and each having an alignment film, and a liquid crystal layer having a plurality of pixels provided between the substrates, wherein each of the alignment films comprise a first homeotropic alignment film rubbed, and a second homeotropic alignment film not rubbed and deposited on the first homeotropic alignment film at a position within a half region of a portion of the plurality of pixels; wherein the alignment films are positioned such that the unrubbed portion of one alignment film faces a rubbed portion of the other alignment film.

2. A liquid crystal display device comprising:
a pair of substrates arranged opposite to each other and each having an alignment film, and a liquid crystal layer having a plurality of pixels provided between the substrates;
wherein each of the alignment films comprises a first homeotropic alignment film rubbed, and a second homeotropic alignment film unrubbed and positioned on a portion of the first rubbed homeotropic alignment film over an entire region of each alternate pixel of the plurality of pixels arranged in a matrix, wherein one of the first homeotropic alignment films is rubbed in one direction and the other first rubbed homeotropic alignment film is rubbed in an opposite direction and the alignment films are positioned such that the unrubbed portions of one alignment film faces the rubbed portions of the other alignment film.

3. The liquid crystal display device according to claim 2, wherein the width of each pixel in the short-side direction thereof is 50 μm or less.

4. A liquid crystal display device comprising a pair of substrates arranged across from one another and each having an alignment film separated by a liquid crystal layer comprised of a plurality of pixels; wherein each alignment film comprises a rubbed homeotropic alignment film positioned over an entire region of the plurality of pixels arranged in a matrix; wherein in each alignment film a first portion of the rubbed homeotropic alignment film positioned near a pair of adjacent pixels is rubbed in one direction and a second portion of the rubbed homeotropic alignment film positioned near the pair of adjacent pixels is rubbed in an opposite direction; and wherein the alignment films are positioned such that the first and the second portions of one alignment film, respectively, faces the first and the second portions of the other alignment film, respectively.

* * * * *